Patented Dec. 18, 1923.

1,477,671

UNITED STATES PATENT OFFICE.

CHARLES F. STAUDENMAYER, OF BALTIMORE, MARYLAND.

ARTIFICIAL FUEL AND PROCESS FOR MAKING THE SAME.

No Drawing.   Application filed July 7, 1922.   Serial No. 573,480.

*To all whom it may concern:*

Be it known that I, CHARLES F. STAUDENMAYER, a citizen of the United States, residing at Baltimore, State of Maryland, have invented certain new and useful Improvements in Artificial Fuel and Processes for Making the Same, of which the following is a specification.

The object of my invention is to provide a new artificial fuel which will compare favorably to the best bituminous coal in heat giving qualities, that it will be more desirable as a fuel than the latter because it will not clinker, thereby lengthening the life of stoves and grates, and by experiment I have found that an average of 82.22% of the whole volume of this new artificial fuel is consumed or used up in giving out heat while a residue of 17.78% is unconsumed in the form of fine ashes, and, further, this invention includes a process of making the above artificial fuel.

From the base of this artificial fuel, which is the coal cinders usually considered waste matter from steam-boilers or furnaces, the moisture is removed by a drying process, after which the cinders are ground to a powdered form and then thoroughly mixed with dry saw-dust. To this mixture is added tar oil in a liquid state at a high heat temperature, and then while the completed mixture is kept, by heating, in a liquid state it is formed into briquettes of any desired shape, one form of which can be like a brick with holes therein to present as large an area as possible to the flame, thereby causing the briquets to be consumed rapidly, giving out a great volume of heat in a given time.

The proportions of the elements used to make this artificial fuel are as follows; dry powdered coal cinders, 40%; dry saw-dust, 40%; and tar oil, 20%.

Having thus described my invention, what I claim is—

1. An artificial fuel briquette comprising dry ground coal cinders, dry saw-dust and tar oil.

2. An artificial fuel briquette consisting of dry ground coal cinders 40%, dry saw-dust 40% and tar oil 20%.

3. The process of making artificial fuel briquettes which consists in drying coal cinders, reducing said dry cinders to powdered form, adding dried sawdust to said dry, powdered cinders, mixing said sawdust and said cinders, adding highly heated tar oil to said mixture of sawdust and cinders, and maintaining the mixture of sawdust, cinders and tar oil at high heat while forming the same into briquettes.

In testimony whereof, I have affixed my signature to this specification in the presence of two subscribing witnesses.

CHARLES F. STAUDENMAYER.

Witnesses:
P. OSWALD WEBER,
H. O. WEBER.